US005798496A

United States Patent [19]

Eckhoff et al.

[11] Patent Number: 5,798,496

[45] Date of Patent: Aug. 25, 1998

[54] PLASMA-BASED WASTE DISPOSAL SYSTEM

[76] Inventors: Paul S. Eckhoff, 7580 County Rd. 25, Stockport, N.Y. 12173; George Farrall, 51 Bluff Rd., Rexford, N.Y. 12148

[21] Appl. No.: 629,238

[22] Filed: Apr. 8, 1996

Related U.S. Application Data

[63] Continuation-in-part of Ser. No. 370,392, Jan. 9, 1995, abandoned.

[51] Int. Cl.[6] ..................................................... B23K 10/00

[52] U.S. Cl. ................................ 219/121.36; 219/121.52; 219/121.37; 219/121.48; 110/241; 110/246; 373/22; 373/20

[58] Field of Search ......................... 219/121.36, 121.37, 219/121.38, 121.43, 121.44, 121.59, 121.52, 121.48; 110/240, 241, 246, 250; 588/900; 373/18–22

[56] References Cited

U.S. PATENT DOCUMENTS

| | | | |
|---|---|---|---|
| 3,830,950 | 8/1974 | Schoumaker et al. . | |
| 3,938,450 | 2/1976 | Jaronko et al. . | |
| 4,220,843 | 9/1980 | Borer et al. . | |
| 4,361,441 | 11/1982 | Tylko | 219/121.36 |
| 4,425,659 | 1/1984 | Stenkvist | 373/108 |
| 4,688,494 | 8/1987 | Domnitch . | |
| 4,713,826 | 12/1987 | Bebber et al. . | |
| 4,738,702 | 4/1988 | Yigdall et al. . | |
| 4,770,109 | 9/1988 | Schlienger | 110/247 |
| 4,918,282 | 4/1990 | Cheek . | |
| 5,220,873 | 6/1993 | Milsap, III | 110/240 |
| 5,237,938 | 8/1993 | Fujimori et al. . | |
| 5,245,627 | 9/1993 | Drouet . | |
| 5,399,833 | 3/1995 | Camacho | 219/121.59 |
| 5,408,494 | 4/1995 | Schlienger . | |
| 5,415,113 | 5/1995 | Wheeler et al. . | |
| 5,421,850 | 6/1995 | Dube et al. | 75/10.19 |

*Primary Examiner*—Mark H. Paschall
*Attorney, Agent, or Firm*—Galgano & Burke

[57] ABSTRACT

Method and apparatus for the disposal of waste including a rotary kiln comprising at least one, and preferably a plurality of plasma guns positioned within a chamber defined by the rotary kiln, and at least one target electrode which is rotatable. One preferred embodiment of the present invention comprises a portable waste disposal unit wherein a rotary kiln, at least one plasma gun and a movable target electrode are advantageously positioned on a truck for ready transportation to a waste site.

41 Claims, 4 Drawing Sheets

PLASMA-BASED WASTE DISPOSAL SYSTEM

This application is a continuation-in-part of U.S. patent application Ser. No. 08/370,392, filed Jan. 9, 1995 now abandoned.

The present invention is directed to waste disposal and, more particularly, to improvements in methods and apparatus for waste disposal which utilize at least one plasma arc to destroy waste at ultra-high temperatures in a substantially inert atmosphere preferably through a continuous process.

BACKGROUND OF THE INVENTION

The disposal of hazardous waste is a problem of global proportions. Many solutions have been proposed for treating such wastes including incineration in rotary kilns. Due to the chemical nature of many materials, incineration is not a preferred manner of disposal since flue gases resulting from incineration may be particularly harmful to the environment. It would therefore be desirable to provide a process for the disposal of waste materials which does not have the same adverse impact on the environment as incineration.

Experiments have been conducted and reported in the literature wherein solid waste is treated with high power plasma arcs in a batch process. Since contaminated waste is often found in remote areas far from incineration plants and disposal sites, it is often necessary to load the waste material into train cars and/or trucks for transporting to a waste disposal/treatment site. The handling and shipping of hazardous materials is very expensive and, in some instances, objectionable. It would therefore be desirable to provide a method and apparatus for disposing of waste at a waste site which would not require the expensive handling and transporting of the waste material.

Those skilled in the art will appreciate that a plasma gun is an electrical device for reshaping a more or less conventional arc into a flame much like that of a blowtorch, but at very high electrical power. Levels of several megawatts are not uncommon in metallurgical applications. Typically, plasma guns are used in applications where concentrated heat sources are required.

The shape of a conventional high power arc in a gaseous medium such as air, nitrogen, or $CO_2$ is approximately columnar and axisymmetric as it exists between rod or button shaped electrodes (anode and cathode) which oppose each other by some specified distance. This distance typically ranges from a fraction of an inch to a foot or more. In a plasma gun, the electrode arrangement is often a rod shaped cathode lying coaxially within an anode which is in the shape of a hollow cylinder.

Given no other constraints, the arc established between anode and cathode forms a column extending between the cathode and anode surfaces across what is essentially the shortest line-of-sight distance. To form a "flame" extending out of a nozzle and beyond the anode, it is the usual practice to blow gas having a strong axial velocity component into the space between the anode and cathode. The gas serves to greatly distort the arc "column" into a "U" shape which is still attached to the anode and cathode surfaces at the two points of the "U". The bulk of the "U" shape therefore extends beyond the nozzle, forming a "torch" flame. While an axial gas flow serves to produce the desired shape, the root points of the arc at the anode and cathode surfaces tend to remain stationary. Since these "footprints" are highly contracted at their point of attachment, the power density at the electrode surfaces typically exceeds a megawatt per square centimeter—even for arcs that are relatively low in total power, such as 1 kWatt. Such high power densities cause the root points to melt and vaporize, severely limiting the useful life of the electrodes.

To reduce the erosion losses at the electrodes and thereby extend their useful life, an arc is preferably continuously moved in a circular path on the electrode surfaces. One method for accomplishing this is to impart a circumferential velocity component of velocity to the gas used to blow the discharge into a flame shape. Usually this is done by injecting the gas through a tube with their axes perpendicular to the axis of symmetry of the gun at the largest possible radius in the radial space between the anode and cathode. The flow is thus tangent to the inner circumference of the coaxial anode, producing a swirl or "vortex" in the gas stream. Since the arc actually "exists" in the ionized gas so introduced, this technique tends to cause an otherwise stationary arc to move, not only in the column itself, but also at the attachment of the arc to the anode and cathode. Another conventional method for producing arc rotation is the application of a magnetic field in an appropriate configuration.

In the anticipated application of a plasma gun to the present invention, plasma torches may be required to operate for long periods of time at high power without failure. In a rotary kiln of the size proposed, thermal insulation using hard, refractory materials is required. Such materials require long periods of gradual temperature change in bringing the system to appropriate operating temperatures or shutting down the system after completion of a working session. Such insulation materials are glass-like in their thermal properties. Typically, warmup and cool-down periods of two or more days are required if destruction of the insulation is to be avoided due to thermal stresses. The chosen torch designs generally must be capable of operating at power levels up to 250 kilowatts with attendant long electrode life for many of the applications addressed by the subject patent application.

SUMMARY OF THE INVENTION

Various embodiments of the present invention are directed to improvements in methods and apparatus for the disposal of waste. One embodiment of the present invention comprises a rotary kiln comprising at least one, and preferably a plurality of plasma guns positioned within a chamber defined by the rotary kiln, and at least one secondary electrode physically displaced from the torch. Preferably, two target electrodes are included in which one is located closer and one located further away from the plasma gun(s).

One preferred embodiment of the present invention comprises a portable waste disposal unit wherein a rotary kiln having at least one plasma gun and the option of at least one variably positioned secondary electrode are advantageously mounted on a truck for ready transportation to a waste site.

Other aspects of the present invention relate to improvements in novel plasma guns particularly adapted for the present invention.

It is noted that the present invention is not directed toward incinerator devices which are facilities for burning materials, i.e. a chemical process in which waste material is combined with an oxidizing agent such as atmospheric oxygen typically yielding heat and light. With reference to hazardous wastes, an incinerator process typically yields byproducts which themselves may be hazardous.

In contrast to the relatively low temperatures required for incineration, the present invention employs a plasma torch to achieve temperatures greater than 10,000 degrees Celsius for pyrolysis treatment of hazardous wastes. Pyrolysis preferably takes place, in the absence of oxidizing agents and is frequently associated with high current electrical discharges that chemically dissociate waste products into simpler—and more benign fractions.

DETAILED DESCRIPTION

The various aspects of the present invention relate to apparatus and methods particularly adapted for the disposal of waste including hazardous materials and other waste whether in solid, sludge or liquid form. The present invention is distinguished from prior attempts to incinerate waste and instead employs pyrolysis to effect the destruction of the waste material, yielding fewer environmentally threatening flue gases than would result from incineration.

One preferred embodiment of the present invention comprises the use of at least one plasma gun and a target electrode which is advantageously movable, most preferably extendable and rotatable. This embodiment is illustrated in FIG. 1 wherein a rotary kiln receives two plasma guns (only one of which is visible in side view) mounted on a movable breech all of which are mounted on a truck to facilitate movement of the entire disposal apparatus to a remote waste site.

Figure 1:
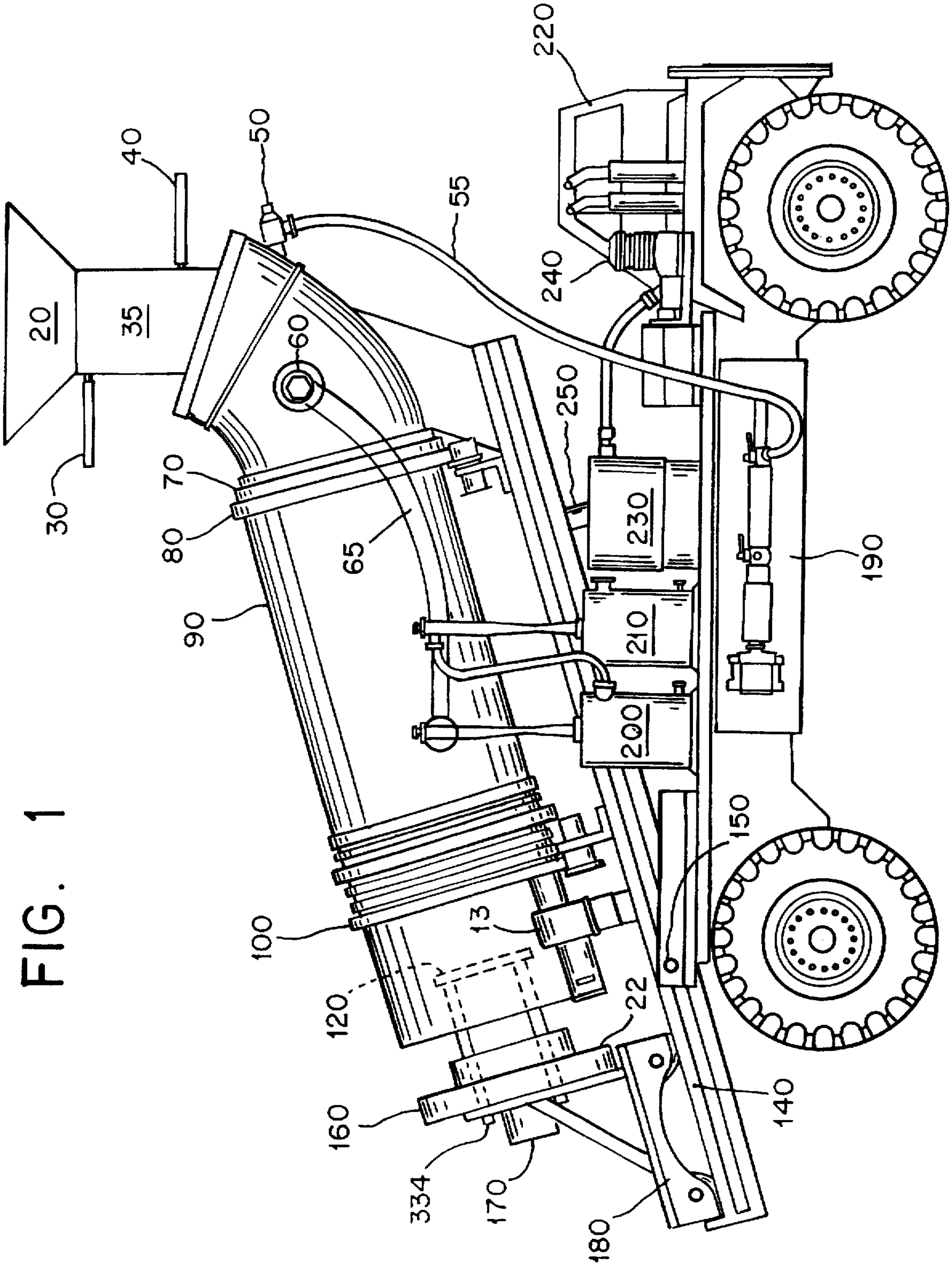
FIG. 1 is a side view of one embodiment of the present invention.

The embodiment illustrated in FIG. 1 comprises a hopper inlet screen 10 positioned at the mouth of a hopper 20. The hopper 20 is designed to guide waste material into a first chamber 35 which can be closed by an upper slide valve 30 and a lower slide valve 40 which define the first chamber 35 and allow the first chamber 35 to be filled with an inert gas, such as nitrogen or argon. An inlet 50 is also provided to receive waste materials which are in the form of liquids and/or sludge. Such waste can be pumped into inlet 50 through conduit 55 with pump 190. From the description below, it will be appreciated that the waste can be partially preheated in chamber 35.

Also located toward the upper end of the apparatus is an off-gas connection 60 adapted to draw gases from the kiln and direct those gases through conduit 65 to a two-stage scrubbing unit comprising first stage scrubber 200 and second-stage scrubber 210. A recess chamber 22 allows for the removal of glass/slag.

The main kiln shell 90, which according to this embodiment of the present invention is rotatable, is connected to the fixed upper segments by a rotary seal 70 and a roll ring 80. At the lower end of the rotary kiln a lower roll ring 100 is provided. The outside shell of the main kiln is cooled in part by a blower 13. The details of the rotary seal 70 and roll ring 80 are not described in further detail herein as they comprise components known to those of ordinary skill in the art.

At the lower end of the rotary kiln, a movable breech 160, comprising two plasma guns 170 (only one of which is visible on side view) and two target second anodes 120 (only one of which is visible on side view), is mounted on a rolling support 180. The target second anodes 120 of this illustrated embodiment each preferably comprise a graphite target plate (illustrated in phantom). Each graphite plate is supported by a graphite leg 334 which is preferably screwed into the plate and movably relative to breech 160. The legs 334 and hence the target anode plates 120 are extendable and rotatable relative to the plasma guns 170. The target anodes 120 of this embodiment do not rotate with the kiln but are independently rotatable by rotating the legs 334.

The provision of movable breech 160 of the illustrated design simplifies operation and manufacture. This design also provides kiln operators with the option of replacing the entire breech unit, including the plasma guns, in the field without cooling the entire kiln. Those skilled in the art will therefore appreciate that the present design greatly minimizes down time of this unit. The provision of two independently operable plasma guns 170 and target anodes 120 also increases the reliability of the entire disposal unit. In the event that one of the plasma guns 170 or target anodes 120 fail, the other gun/anode pair will continue to operate. Furthermore, the provision of two separate plasma guns 170 doubles the amount of heat which can be supplied to the waste being disposed.

Figure 2:
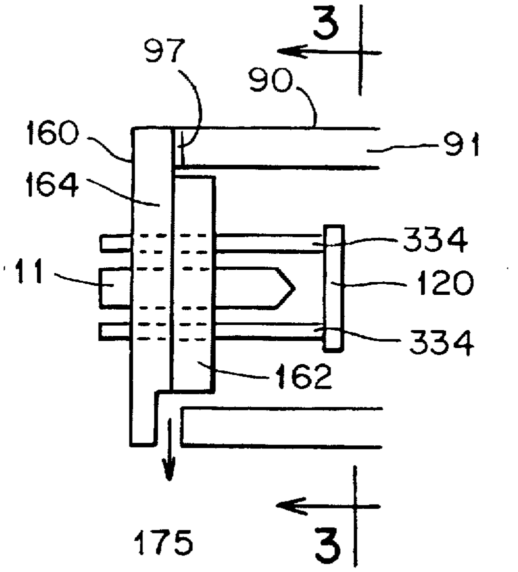
FIG. 2 is a cross-sectional view of the lower end of the kiln and breech shown in FIG. 1 but in a more closed position.

With reference to FIG. 2, the inner walls of the breech 160 are preferably provided with a refractory face such as a ceramic liner. Preferably, the entire breech is formed of a refractory material 162 and provided with a metallic back plate 164, formed for example of steel, in order to securely support the plasma guns 170 shown in FIGS. 1 and 3. At all points other than the exit orifice 175 shown in FIG. 2, a breech seal 97 seals the breech to the lower portion of the kiln 90.

Figure 4:
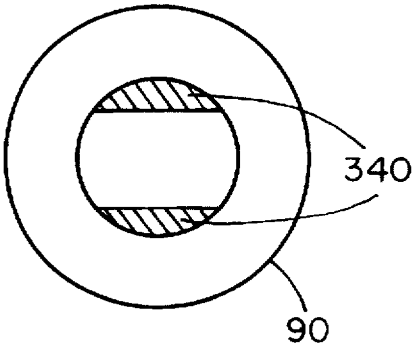
FIG. 4 is an end view of the lower portion of the kiln showing two flow barriers.

From the present description, those skilled in the art will appreciate that as the waste material is fed into the plasma arc, it can form a molten glass. A plurality of flow barriers 340, best shown in FIG. 4, are provided on the internal walls of rotating kiln 90 proximate the operation position of target anodes 120 (not shown in FIG. 4). The flow barriers 340 will tend to cause a build up of molten glass during peak operation and enhance waste destruction for the reasons set forth below.

With reference again to FIG. 2, the lower end of the kiln and the breech 160 are advantageously spaced in order to allow such molten glass to exit via exit orifice 175 from the kiln 90. In the case of molten glass as might arise from the plasma treatment of soils for example, as the molten glass exits, it can be advantageously sprayed with water causing the glass to shatter into shards which are then can be subsequently crushed to the size of coarse sand. This procedure permits the glass to be handled with conventional equipment and used as a component of concrete or landfill. As glass, the resulting material is not leachable and therefore reduces the threat to the environment.

Referring again to FIG. 1, the entire kiln assembly is preferably mounted on a selectively tiltable frame 140 which is connected by a pivot 150 to the frame of truck 220. At least one hydraulic lifter 250 is connected to frame 140 for tilting the kiln into an operating position as illustrated in FIG. 1. Those skilled in the art will appreciate that the angle at which is kiln is operated can be readily adjusted depending upon the particular process being performed and the desired resident time for the waste material being treated. Frame 140 is designed to be lowered to a horizontal position and the hopper assembly, i.e., hopper 20 and chamber 35, can be removed in order to limit the overall height of this disposal unit for transporting. For example, it is preferable to restrict the overall height of the disposal unit during transport to about 13 feet, the overall length to about 24 feet, and the width to about 8 feet.

While the preferred operation of the destruction process of the present invention comprises the use of an inert gas in order to avoid combustion, in certain locations it may be preferable to utilize the exhaust from a diesel truck where inert gas such as nitrogen, argon or other common inert gases, are not available. Therefore, the illustrated embodiment of the present invention also comprises a cooler 230 and compressor 240 which operate to cool and compress the diesel exhaust from the truck. The compressed diesel exhaust can then be utilized as the plasma and at the same time reduces the overall emissions of the disposal unit by ultimately passing those emissions through the arcing process and subsequent scrubber units.

The second anode, or target anode, is preferably formed from graphite. The choice of graphite for use as a second anode to the plasma torch is based partly upon the fact that 1) graphite is a highly refractory conductor that can tolerate operating kiln temperatures and 2) even at decomposition temperatures, the graphite changes directly to the vapor phase thus avoiding the distortion and flow characteristics of normal conductors which pass through a liquid phase at high temperature.

With reference again to FIG. 2, in a preferred embodiment the target second anodes 120, in the form of a plate, may be supported from the fixed breech end of the kiln and initially spaced by mounting rods 334 a few inches away from the first anode of the plasma gun. The material for this target second anode 120 is usually chosen to be a refractory metal and as stated above is commonly graphite. The purpose of this structure is to provide a surface at a relative positive potential with respect to the plasma gun cathode such that the cathode, may be moved through the first anode, into contact with the target second anode 120. By this means, an arc can be initiated between the cathode and target second anode 120 by separating the cathode from its initial contact with the target second anode 120 while a voltage is applied between the cathode and the target second anode. Such an arc is called a “drawn arc” by those skilled in the art. Subsequent to the formation of the drawn arc, a portion, or alternatively all, of the arc current in the drawn arc may be transferred to the first anode by establishing a suitable voltage at the first anode. In the absence of the target second anode 120, an arc can be established between the cathode and the first anode by a variety of means known to those skilled in the art, including RF ignition, or fuse wire.

An important functional property of graphite is its high electrical resistivity. Used as a target second anode within the central region of the kiln, it carries high current and develops significant $I^2R$ heating where the heat is most useful—adjacent to the soil charge. Under conditions where that charge become liquid, the graphite serves as a high temperature boundary, further enhancing heat transfer. With the development of a liquid glass pool, the opportunity also exists for transfer of the torch arc directly to the glass itself since the melt at high temperature becomes partially conductive. In making the melt the target second anode provides the most efficient heat transfer mechanism to the glass and is highly desirable. Once a pool or charge in the melt phase has been established, the liquid phase can be maintained even with new solid material entering the melt, by establishing a current between two electrodes, typically graphite, by applying sufficient voltage between the two said electrodes. Because of the $I^2R$ heating produced by such current, the power supplied by the plasma guns may be reduced or possibly even turned off. However, a preferred mode is to operate the guns at reduced power. In the preferred embodiment the two graphite target second anodes (one for each gun) maintain contact with the soil charge and will be separately accessible through insulated terminals on the breech. It is therefore possible to provide the two terminals required to maintain $I^2R$ heating of the soil charge independent of the plasma guns.

Figure 3:
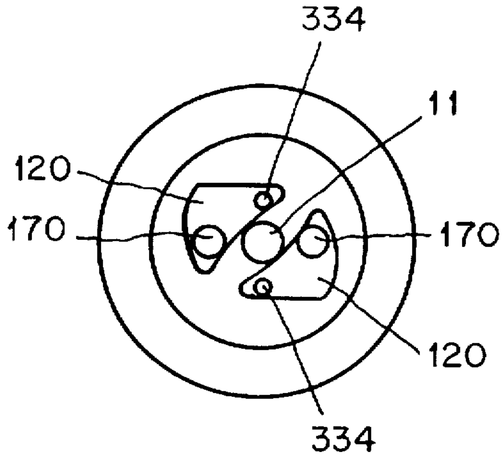
FIG. 3 is an end view of the breech shown in FIG. 2 taken from the direction of line 3—3.

According to another aspect of the present invention illustrated in FIGS. 3 and 4, the target anodes 120 are preferably constructed of graphite and shaped in a manner which allows glass to form on its lower periphery. This design allows the molten glass to flow in the space between the target second anode 120 and kiln liner 91.

As stated above with reference to FIG. 1, the illustrated embodiment also comprises a diesel exhaust cooler 230 and compressor 240 which provide the option of using diesel exhaust as the plasma gas. The novel use of a cooled and compressed diesel exhaust provides a method of reducing the overall emissions of the portable disposal unit. Furthermore, since all emissions are preferably passed through a final gas scrubber unit, the impact on the environment is minimized. The use of diesel exhaust in remote locations may be particularly economical in instances where it is difficult to obtain large quantities of inert gas, such as nitrogen and argon.

Variably Spaced Secondary Electrodes

Figure 5:
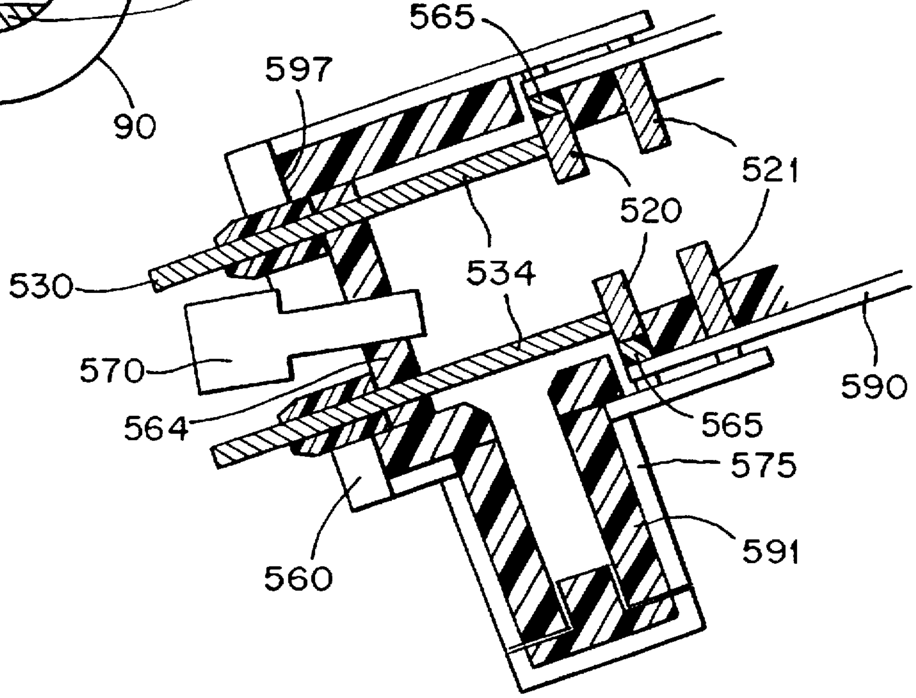
FIG. 5 is an enlarged cross-sectional view of the lower end of a kiln and breech showing an alternative embodiment of a breech.
Figure 6A:
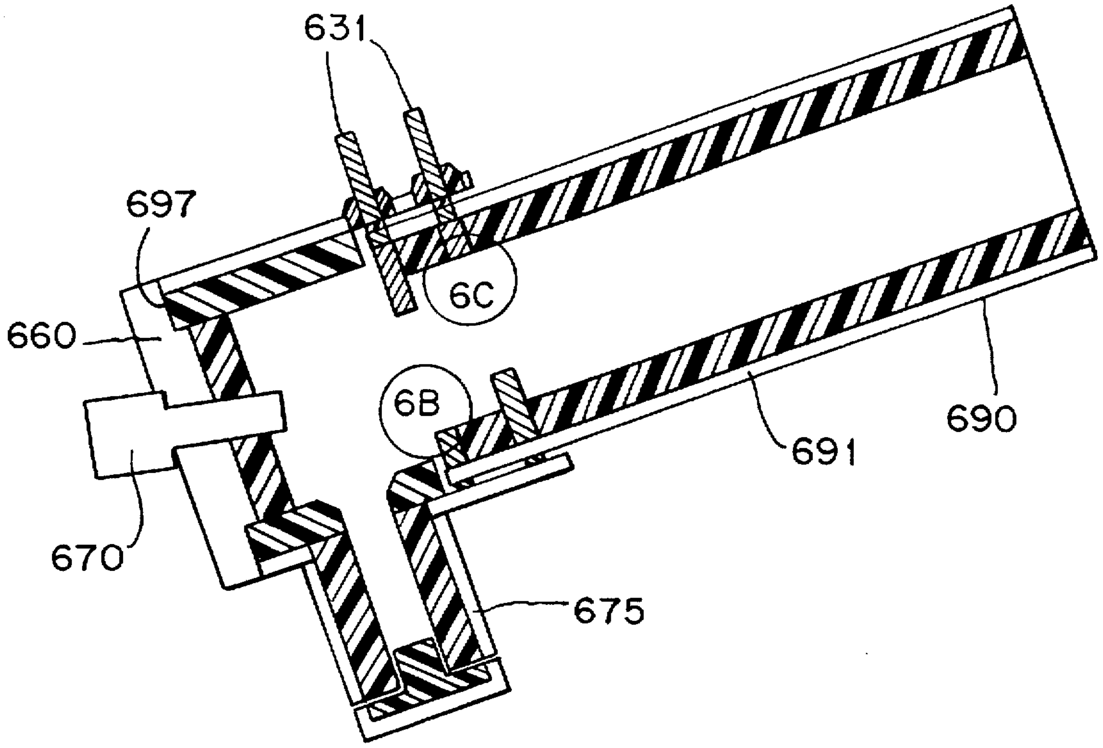
FIG. 6*a* is an enlarged cross-sectional view of the lower end of a kiln and breech showing still another alternative embodiment of a breech.
Figure 6B:
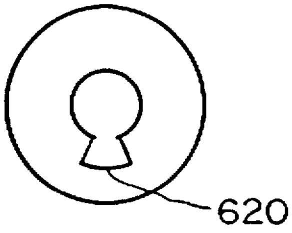
FIGS. 6*b* and 6*c* are enlarged plan views of the secondary electrodes shown in FIG. 6*a*.
Figure 6C:
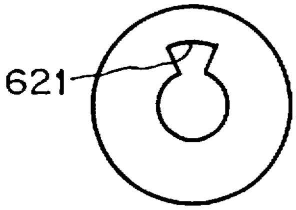
Figure 7:
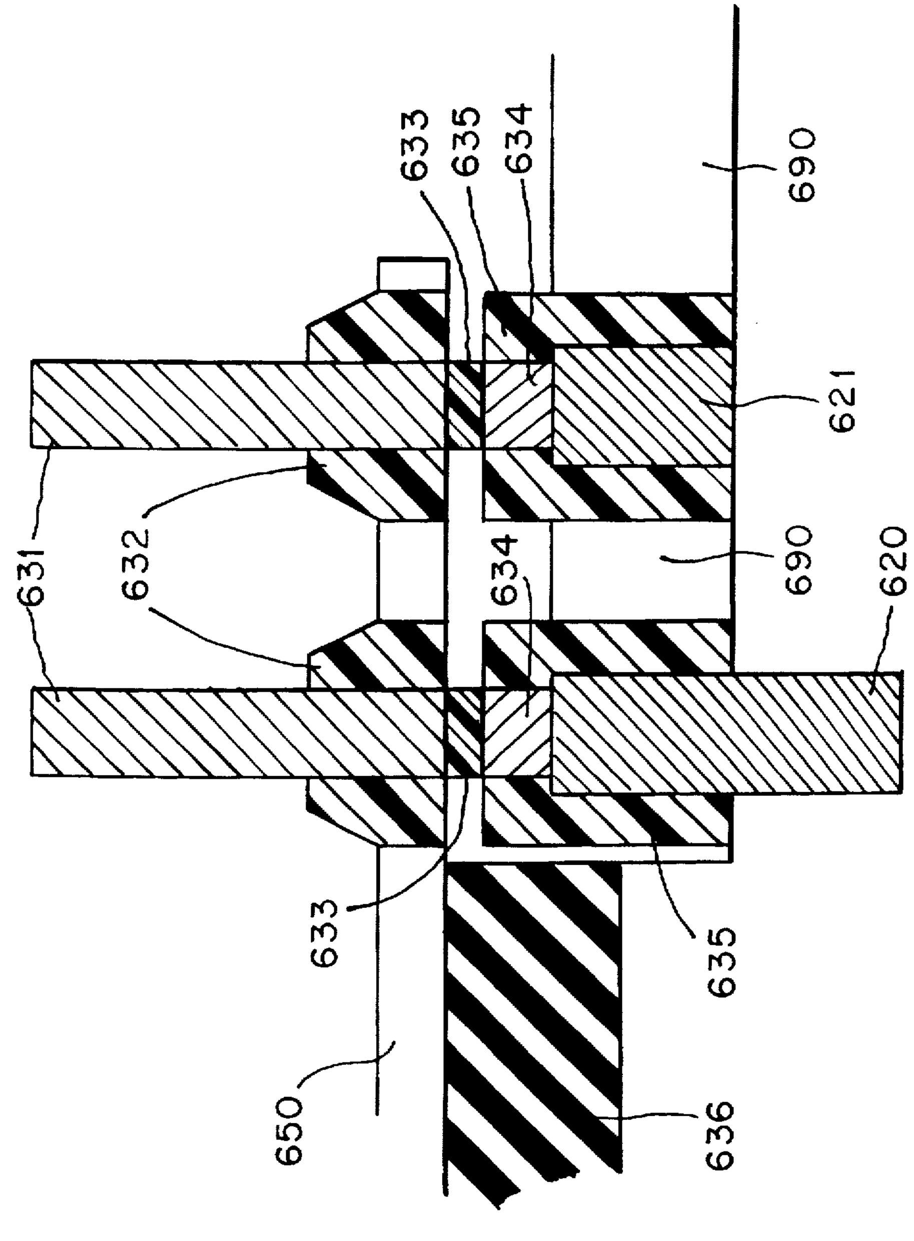
FIG. 7 is an enlarged partial view of the secondary electrodes shown in FIG. 6*a*.

With reference to FIGS. 5–7, additional preferred embodiments of the present invention comprise the use of at least one plasma gun and secondary electrodes which are advantageously variably positioned, i.e., the secondary electrodes are spaced at different distances from the plasma gun or guns.

As shown in FIG. 5, a moveable breech 560 comprises two plasma guns 570 (only one of which is shown) and one or more secondary electrodes 520 and 521. The secondary electrodes 520 and 521 of this illustrated embodiment each preferably comprise a graphite element, which in the preferred illustrated embodiment are angularly shaped. Each graphite element can be supported by a graphite leg 530 and 534 which is preferably screwed into the element and adjustable relative to breech 560. The legs 530 and 534 and hence the secondary electrodes 520 and 521 are independently extendable and rotatable relative to the plasma guns 570. The secondary electrodes of this preferred embodiment do not rotate with the kiln but are independently rotatable by rotating the legs 534.

One important aspect of this design is that it permits the ignition of the arc in the plasma torch by simply positioning a secondary electrode opposite the plasma gun and extending the cathode of the gun axially to a position proximate to or in contact with the secondary electrode while voltage of positive polarity with respect to the cathode is applied to the secondary surface. An arc formed in such a manner is a “drawn” arc. Once ignition occurs, a portion, or alternatively all of the arc current is transferred to the torch anode. It is appreciated that alternative means such as RF ignition, and fuse wire can be employed for torch ignition, but the simplicity and reliability of the method noted above is extremely attractive. This requires, of course, a plasma gun especially designed for this purpose.

From the present description, those skilled in the art will appreciate that as the waste material is fed into the kiln, especially as it reaches the vicinity of the plasma guns, it can form a molten glass. The one or more secondary electrodes 520 and or 521 can also advantageously be employed to serve as barriers adjacent to the internal walls 590 of the kiln to cause a buildup of molten glass or other product liquid to enhance waste destruction for the reasons set forth below.

Another preferred embodiment of the present invention is shown in FIG. 6A which comprises the use of at least one plasma gun and one or more secondary electrodes. In the illustrated embodiment, two plasma guns 670 (only one of which is shown) are mounted side by side in the "breech" portion.

In FIG. 6A, secondary electrodes 620 and 621 are disk-shaped and are made from thermally resistant material such as graphite with a keyhole-shaped cutout in the center as best shown in FIGS. 6B and 6C. The disk-shaped electrodes are preferably about 2 inches thick, and are mounted with the key portion of the keyhole-shaped cutout offset or rotated 180 degrees from one another. It is important to note that when the kiln is rotated waste material is permitted to travel through the openings of the secondary electrode 621. After passing through the opening in electrode 621, the waste is trapped between both secondary electrodes before being able to pass through the offset key-shaped opening of lower secondary electrode 620. In other embodiments, different shape cutouts and materials may be used. In this embodiment, the disk shaped electrodes are mounted in the rotating portion of the kiln 690 with electrical access illustrated by the enlarged view of FIG. 7.

As best shown in FIG. 7, at the top of the breech housing 660, two electrical terminals 631 are mounted for connecting the electrodes to one or more sources of electrical power by slip rings. These terminals are isolated by electrical insulators 632. It will be appreciated that the number of electrical terminals may differ in other embodiments.

The lower portion of FIG. 7 shows partial views of the disk-shaped secondary electrodes 620 and 621 attached to the lower end of the rotatable portion of the kiln 690. Electrical connection from terminals 631 to secondary electrodes 620 and 621 is made via one or more conducting pins 634 connecting the outer circumference of secondary electrodes 620 and 621 via a bearing and brush assembly 633. Insulators 635 provide electrical isolation of the pins 634 from the rotating kiln enclosure 690, while breach insulation 636 provides additional electrical insulation. The details of the bearing and brush assembly 633 may take a variety of conventional forms envisaged by those skilled in the art. The assembly is designed to provide a low gas leakage joint between fixed and rotating surfaces as well as provide a sliding electrical contact of the type employed in heavy rotating electrical machinery between the terminals 631 and secondary electrodes 620 and 621.

Functionally, the secondary electrodes 620 and 621 can be utilized in a variety of modes. Without necessarily making electrical connection to terminals, and with a variety of shapes they can serve to accumulate a given mass of material in the kiln in the region near the torch plasma guns where the heating is most intense as described above.

As described above, heating in the region between secondary electrodes is further enhanced by operating the torch plasma guns in a "transferred" arc mode. In the "transferred" arc mode, the attachment of the arc to the anode terminal inside the torch can be electrically transferred, partially or completely, to one or more of terminals 631. Thus, the cathode attachment of the arc generated by the plasma gun is retained inside the torch, but the anode to that same discharge can become one or both of the secondary electrodes 620 and 621, with, if desired, no anode terminal inside the torch. This is an extremely efficient method of heating waste material because it can provide direct heating of the secondary electrodes which serve to spread the heat input via conduction in graphite, for example, over a large area. This effect is enhanced by the fact that graphite, while a significant conductor, is also somewhat resistive. The mere passage of current through this material causes resistive heating in the graphite, further increasing its temperature.

It will be appreciated that secondary electrodes 620 and 621 can be designed with only a central circular aperture, so that a toroidal shaped "crucible" is formed, capable of collecting a quantity of hot waste material, with crucible walls of secondary electrodes 620 and 621 being directly heated by the plasma guns. There are, of course, several different operating modes achievable with such an arrangement, including one based upon a two-torch system where, for example, one torch heats secondary electrode 620 and the other heats secondary electrode 621.

Desirably, a still more efficient heating technique utilizes the mass of material collected in the rotating crucible which becomes hot enough to be electrically conducting. Once such a threshold temperature condition is attained, significant electrical power can be applied between terminals 631 such that current passes directly though the waste material via the secondary electrodes 620 and 621. In such a case essentially all of the electrical power dissipated by conduction in the waste material is used for heating. At this point, the plasma guns are no longer needed, however, it is desirable to have some torch power available, especially if the waste material is non-uniform in composition and therefore likely to vary significantly in its conductive properties after initial heating. In some cases, the processing of materials that are conducting at high temperature such as glass can be continued by transferring the arc directly to the glass pool itself.

It will be appreciated that various design choices for providing electrical access or power to the secondary electrodes can be employed by those skilled in the art, e.g., fixed or rotating secondary electrodes, or a combination thereof. By varying the number and disposition of torches, secondary electrodes, as well as electrode shapes and materials used it is possible to efficiently process a wide variety of materials.

OPERATION SEQUENCE

With reference to FIGS. 1, 2 and 3, the relationship of the various components for the above-described waste disposal equipment will be clarified by the following sequence of operations beginning with the rotary kiln inclined at the proper angle and connections to power sources made.

Since the ceramic liner 91 of the kiln 90 is especially sensitive to thermal shock, it is first necessary to pre-heat the unit, gradually increasing the internal temperature over a period of several days. Rapid heating will cause the ceramic to shatter. Recommendations of the required pre-heat cycle are supplied by the liner manufacturer. Pre-heat can be accomplished via the plasma guns or by employing auxiliary gas units 11 (FIG. 2 and 3), provision for which can be made at the breech end of the unit. Regardless of which source is used, preheating should be accompanied by gas flow, preferably using diesel exhaust, and by kiln rotation. These measures are aimed at providing uniform heating of the liner and avoiding local thermal stresses.

With an initial, low-velocity gas flow, the plasma guns are ignited. If "drawn arc" ignition is employed, the anode within the plasma gun plays no part and is electrically isolated, usually by high impedance. Current between a gun with extendible cathode and the secondary electrode is adjusted to be a few hundreds of Amperes and the cathode withdrawn from contact with the secondary electrode to its steady state position. After a few minutes, the arc will thermally stabilize as indicated by a voltage measurement across the arc itself. With a stable arc, the current and gas flow can be increased to their steady-state levels.

Next, a gun, preferably having a magnetic field coil 230 is energized with a suitable current magnitude. This will have a focusing effect upon the arc plume now emanating from the barrel of the torch. The impedance in series with the torch anode is then adjusted to give the desired fraction of total current to that surface. A corresponding drop in current to the secondary electrode should be observed. Current flow to the torch anode should enhance the vortex rotation resulting from the gas flow provided the magnetic field is established with proper coil current polarity and aid in prolonging electrode life as well as lengthening the arc plume from the plasma torch. Conditions within the kiln are monitored via temperature probes and monitoring cooling water temperature.

With the kiln at full temperature, the waste charge is introduced slowly at first. When the discharge from the breech end becomes liquid, the rate of charging can be increased to levels at which the liquidity is still maintained. In particular, the residence time of the waste material in the kiln can be controlled by varying the inclination angle of the kiln and controlling its rotational speed.

Shutdown of the system should always be done with full gas flow, arc rotation and kiln rotation. Since the same danger of ceramic liner fracture prevails during shut-down, the reduction in power should occur over a period similar to that used in pre-heat.

While the illustrated embodiment is presently preferred, it is also within the scope of the present invention to provide one or more secondary electrodes which rotate with the kiln. In this alternative embodiment, the secondary electrodes are most preferably also movable relative to the kiln to enhance maintenance.

The present invention advantageously provides an effective apparatus and method for waste destruction which can be readily transported to the site of the waste. The use of a continuous waste destruction process provides an efficiency not attainable with previously disclosed batch processes.

What is claimed is:

1. A portable plasma-based reactor for pyrolytically treating waste material, the portable reactor comprising:
  - a rotatable kiln comprising an upper end for introduction of waste material and a lower end, said rotatable kiln mounted on a movable vehicle;
  - a breech disposed adjacent said lower end of said kiln, at least one of said breech and said lower end forming an outlet for discharge of pyrolytically treated waste material;
  - at least two plasma guns attached to said breech and disposed so as to direct an arc into said kiln; and
  - at least two target electrodes spaced from said plasma guns and attached to at least one of said breech and said kiln, wherein at least one of said plasma guns and at least one of said target electrodes is movable.

2. A portable plasma-based reactor for pyrolytically treating waste material according to claim 1 wherein at least one of said target electrodes comprises a passageway extending therethrough.

3. A portable plasma-based reactor for pyrolytically treating waste material according to claim 2 wherein at least one of said target electrodes comprise a passageway extending therethrough.

4. A portable plasma-based reactor for pyrolytically treating waste material according to claim 1 wherein each of said plasma guns are connected to a separate source of electrical power.

5. A portable plasma-based reactor for pyrolytically treating waste material according to claim 1 wherein said at least two plasma guns are mounted on a movable breach and said at least two target electrodes are independently movable.

6. A portable plasma-based reactor for pyrolytically treating waste material according to claim 5 wherein said target electrodes are rotatable through an angle of about 90°.

7. A portable plasma-based reactor for pyrolytically treating waste material according to claim 1 wherein said at least two target electrodes comprise graphite.

8. A portable plasma-based reactor for pyrolytically treating waste material according to claim 1 wherein said movable vehicle comprises a motorized truck.

9. A portable plasma-based reactor for pyrolytically treating waste material according to claim 8 further comprising at least one exhaust conduit which transfers at least a portion of an exhaust gas from said truck to said plasma guns for at least one of preheating said kiln and providing a plasma gas.

10. A portable plasma-based reactor for pyrolytically treating waste material according to claim 1 wherein each of said plasma guns comprise a cathode comprising a tungsten cap.

11. A portable plasma-based reactor for pyrolytically treating waste material according to claim 10 wherein said cathode comprises a thoriated tungsten protective cap.

12. A portable plasma-based reactor for pyrolytically treating waste material according to claim 1 wherein said plasma guns and said target electrodes are relatively movable.

13. A portable plasma-based reactor for pyrolytically treating waste material, according to claim 1 wherein said kiln is selectively positionable on an incline.

14. A portable plasma-based reactor for pyrolytically treating waste material, the portable reactor comprising:
  - a rotatable kiln selectively positionable at an incline and comprising an upper end for introduction of waste material and a lower end, said rotatable kiln mounted on a movable vehicle;
  - a breech disposed adjacent said lower end of said kiln, at least one of said breech and said lower end forming an outlet for discharge of pyrolytically treated waste material;
  - at least one plasma gun attached to said breech and disposed so as to direct an arc into said kiln; and
  - at least two target electrodes disposed above said plasma gun and attached to at least one of said breech and said kiln, said at least two target electrodes being rotatable and extendable relative to said plasma gun.

15. A portable plasma-based reactor for pyrolytically treating waste material according to claim 14 wherein said at least one plasma gun is mounted on a movable breech and said at least two target electrodes are supported by said breach.

16. A portable plasma-based reactor for pyrolytically treating waste material according to claim 14 comprising at least two plasma guns.

17. A portable plasma-based reactor for pyrolytically treating waste material according to claim 14 wherein at least one of said target electrodes comprise a copper cap.

18. A portable plasma-based reactor for pyrolytically treating waste material according to claim 14 comprising a truck on which said rotatable kiln is mounted.

19. A portable plasma-based reactor for pyrolytically treating waste material according to claim 14 wherein at least one of said target electrodes are generally kidney-shaped.

20. A portable plasma-based reactor for pyrolytically treating waste material according to claim 14 wherein at least one of said target electrodes is generally in the form of a disk.

21. A portable plasma-based reactor for pyrolytically treating waste material according to claim 14 wherein at least one of said target electrodes comprise a passageway extending therethrough.

22. A portable plasma-based reactor for pyrolytically treating waste material according to claim 21 wherein said passageway is key-hole shaped.

23. A portable plasma-based reactor for pyrolytically treating waste material according to claim 14 comprising two variably-spaced disk-shaped target electrodes, one of said target electrodes being disposed closer to said at least one plasma gun and the other being spaced further away from said at least one plasma gun.

24. A portable plasma-based reactor for pyrolytically treating waste material according to claim 23 comprising at least two disk-shaped electrodes each having a key-hole shaped opening and wherein said key-hole shaped openings are offset 180 degrees from one another.

25. A portable plasma-based reactor for pyrolytically treating waste material according to claim 14 further comprising means for varying the angle of incline.

26. A portable plasma-based reactor for pyrolytically treating waste material according to claim 14 further comprising means for varying the rotational speed of said kiln so as to vary the resident time of the waste material being treated in the kiln.

27. A portable plasma-based reactor for pyrolitically treating waste material according to claim 14 further comprising scrubbers for receiving gas byproducts.

28. A plasma pyrolysis reactor of claim 15 wherein at least a portion of an exhaust gas from said motorized vehicle is directed into said pyrolysis system.

29. A plasma pyrolysis reactor for treatment of waste materials comprising;

a rotatable, furnace body open at its ends and suitably insulated for plasma pyrolysis;

an essentially stationary access chamber connected to the upper end of the furnace body via a rotational, gas-tight seal;

an essentially stationary base connected to the lower end of the furnace body via a rotational, gas-tight seal means and having a separable breech;

said essentially stationary base having means for discharging processed material;

at least one plasma gun arc heat source mounted on the breech of said essentially stationary base; and at least one barrier electrode ring of thermally stable material mounted in the lower end of at least one of said breech and said kiln, wherein said at least one plasma gun and said at least one barrier electrode ring are disposed so that the waste material passes between said at least one plasma gun and said at least one barrier electrode ring prior to discharge of treated waste material from said means for discharging processed material.

30. A plasma pyrolysis reactor according to claim 29 wherein said at least one barrier electrode ring is made from conducting material with said ring having relatively movable contact means with a fixed electrical terminal on said essentially stationary base, and said at least one plasma arc heat source being at least partially axially extendable to a position proximate said barrier electrode ring.

31. A plasma pyrolysis reactor according to claim 29 wherein said at least barrier electrode ring comprises graphite.

32. A plasma pyrolysis reactor according to claim 29 wherein said at least one barrier electrode ring comprises a key-hole shaped opening through which the waste material passes.

33. A plasma pyrolysis reactor according to claim 29 wherein said at least one barrier electrode ring is supported by said breach.

34. A plasma pyrolysis reactor according to claim 29 further comprising two barrier electrode rings, one of which is supported from said breech by electrically conductive means and the other is mounted at the lower end of the rotatable furnace body.

35. A plasma pyrolysis reactor according to claim 29 with said at least one barrier electrode ring is made from an electrical conducting material and mounted separable from said breech with thermally stable supports made from conducting material such as graphite, said supports having electrical means from a terminal on the breech.

36. A plasma pyrolysis reactor according to claim 29 wherein said at least one barrier electrode ring is rotatable through at least 90 degrees.

37. A plasma pyrolysis reactor according to claim 29 further comprising two extendable plasma gun heat sources and two barrier electrode rings.

38. A plasma pyrolysis reactor according to claim 29 further comprising two barrier electrode rings.

39. A plasma pyrolysis reactor according to claim 29 wherein said plasma gun heat source is connected to separate sources of electrical power.

40. A plasma pyrolysis reactor according to claim 29 wherein said reactor is transportable.

41. A plasma pyrolysis reactor according claim 29 wherein transportability is afforded by a motorized vehicle.

* * * * *